United States Patent [19]
Al-Karmi et al.

[11] Patent Number: 6,105,059
[45] Date of Patent: Aug. 15, 2000

[54] PROGRAMMING INFORMATION FOR SERVERS AND CLIENTS IN A DISTRIBUTED COMPUTING ENVIRONMENT USING STUB CODES WITH EVENT INFORMATION FOR A DEBUGGING UTILITY

[75] Inventors: Abdel Naser Al-Karmi, Unionville, Canada; Shamsher S. Singh, Rochester, Minn.; Baldev Singh Soor, Markham, Canada

[73] Assignee: International Business Machines Corporation, Armonk, N.Y.

[21] Appl. No.: 08/766,998

[22] Filed: Dec. 16, 1996

(Under 37 CFR 1.47)

[30] Foreign Application Priority Data

Dec. 29, 1995 [CA] Canada ................................ 2166358

[51] Int. Cl.$^7$ .................................................. G06F 13/00
[52] U.S. Cl. ........................... 709/219; 709/202; 709/304; 395/183.21

[58] Field of Search ..................... 395/200.32, 200.49, 395/183.21, 684, 704, 680; 709/202, 219, 304

[56] References Cited

U.S. PATENT DOCUMENTS

| 5,377,350 | 12/1994 | Skinner .................................. 395/683 |
| 5,430,876 | 7/1995 | Schreiber et al. ..................... 395/684 |
| 5,450,586 | 9/1995 | Kuzara et al. ......................... 395/704 |

*Primary Examiner*—Frank J. Asta
*Assistant Examiner*—Jason D Cardone
*Attorney, Agent, or Firm*—Edward H. Duffield

[57] ABSTRACT

A method and system for generating event information in a distributed computing environment. An event information packet is passed between the client system and the server system in a remote procedure call. Event information, such as trace data, is gathered in the event packet during execution of the remote procedure, and the event packet is passed back to the calling system when the procedure returns. The information in the event packet is made available for use by a program, such as a debugging utility or other application, running in the address space of the client system.

3 Claims, 3 Drawing Sheets

PROGRAMMING INFORMATION FOR
SERVERS AND CLIENTS IN A
DISTRIBUTED COMPUTING
ENVIRONMENT USING STUB CODES WITH
EVENT INFORMATION FOR A DEBUGGING
UTILITY

FIELD OF THE INVENTION

This invention relates to distributed computing, and more particularly to a method and software structure for providing program information for servers and clients in distributed computing.

BACKGROUND OF THE INVENTION

In a traditional or local computing environment, an application is typically run as a single program where a procedure call and the procedure implementation (i.e. code) execute in the same address space. In distributed computing, for example the Distributed Computing Environment (DCE), there is a client-server model in which a client program (i.e. client) and a server program (i.e. server) run, and typically the client and the server execute on different systems in the network.

One of the advantages of a distributed computing environment is the ability to improve performance of an application by distributing its execution to multiple machines. The primary programming structure in DCE for distributing an application across a network is the Remote Procedure Call.

There are existing DCE utilities and services which help users identify, access and share resources that are distributed through the network. There however remains the problem of determining the execution status of the distributed application. Such information is needed in order to provide any practical debug and trace tool, and without a debug tool it becomes very difficult for software developers to trace and analyze the execution of a distributed application. The development of an adequate debug/trace tool is hampered by the lack of a method to generate sufficient debug/trace information that is updated, exchanged, and recorded while the distributed application executes.

It would therefore be an advancement in the art to provide a method for generating event and program information during the execution of an application in a distributed computing environment.

BRIEF SUMMARY OF THE INVENTION

The present invention provides a method for generating an event information packet during execution of a program in distributed computing. The event information packet stores information and data collected during the execution of the remote procedure calls.

The method according to the present invention is non-intrusive and provides a facility for exchanging information between clients and servers in distributed computing.

In another aspect, the present invention provides a programming structure for gathering program information. The event and program information is made available for subsequent processing modules, including debugging/tracing utilities and client-server management utilities.

The event information packet and method according to the present invention also provide a mechanism which may be incorporated into application programs utilizing event driven architectures giving the capability to gather event data and information from remote locations.

According to the invention, there is provided a networked computer system comprising: (a) a server system; (b) a client system having means for initiating a remote procedure call to said server system; (c) network means for transferring information between said server system and said client system, said information including a remote procedure call and results therefrom; (d) said means for initiating having means for generating an event information packet and transferring said event information packet in a remote procedure call; and (e) said client and server systems including means for updating said event information packet with information associated with said remote procedure call.

According to another aspect of the present invention, there is provided a computer system having a client system operating in a client address space, a server system operating in a server address space, communication means for communicating between the client system and the server system, a method performed by said computer system in processing a remote procedure call comprising the steps of: (a) initiating a remote procedure call between the client system and the server system; (b) said initiating system processing said remote procedure call by transmitting an event information packet to the address space of said system having the remote procedure; (c) said initiating system transmitting procedure calling information to the remote system; (d) said remote system using said procedure calling information to process said remote procedure call, and said remote system generating program information for updating said event information packet; (e) passing said updated event information packet to the address space of said initiating system.

In yet another aspect, the present invention provides a computer program product for use in a computer system having a client system operating in a client address space, a server system operating in a server address space, communication means for communicating between the client system and the server system, said computer program product comprising: a recording medium; means recorded on said medium for instructing said computer system to perform the steps of, (a) initiating a remote procedure call between the client system and the server system; (b) said initiating system processing said remote procedure call by transmitting an event information packet to the address space of said system having the remote procedure; (c) said initiating system transmitting procedure calling information to the remote system; (d) said remote system using said procedure calling information to process said remote procedure call, and said remote system generating program information for updating said event information packet; (e) passing said updated event information packet to the address space of said initiating system.

BRIEF DESCRIPTION OF THE DRAWINGS

Reference will now be made, by way of example, to the accompanying drawings which show a preferred embodiment of the present invention, and in which.

DETAILED DESCRIPTION OF THE PREFERRED EMBODIMENT

Figure 1:
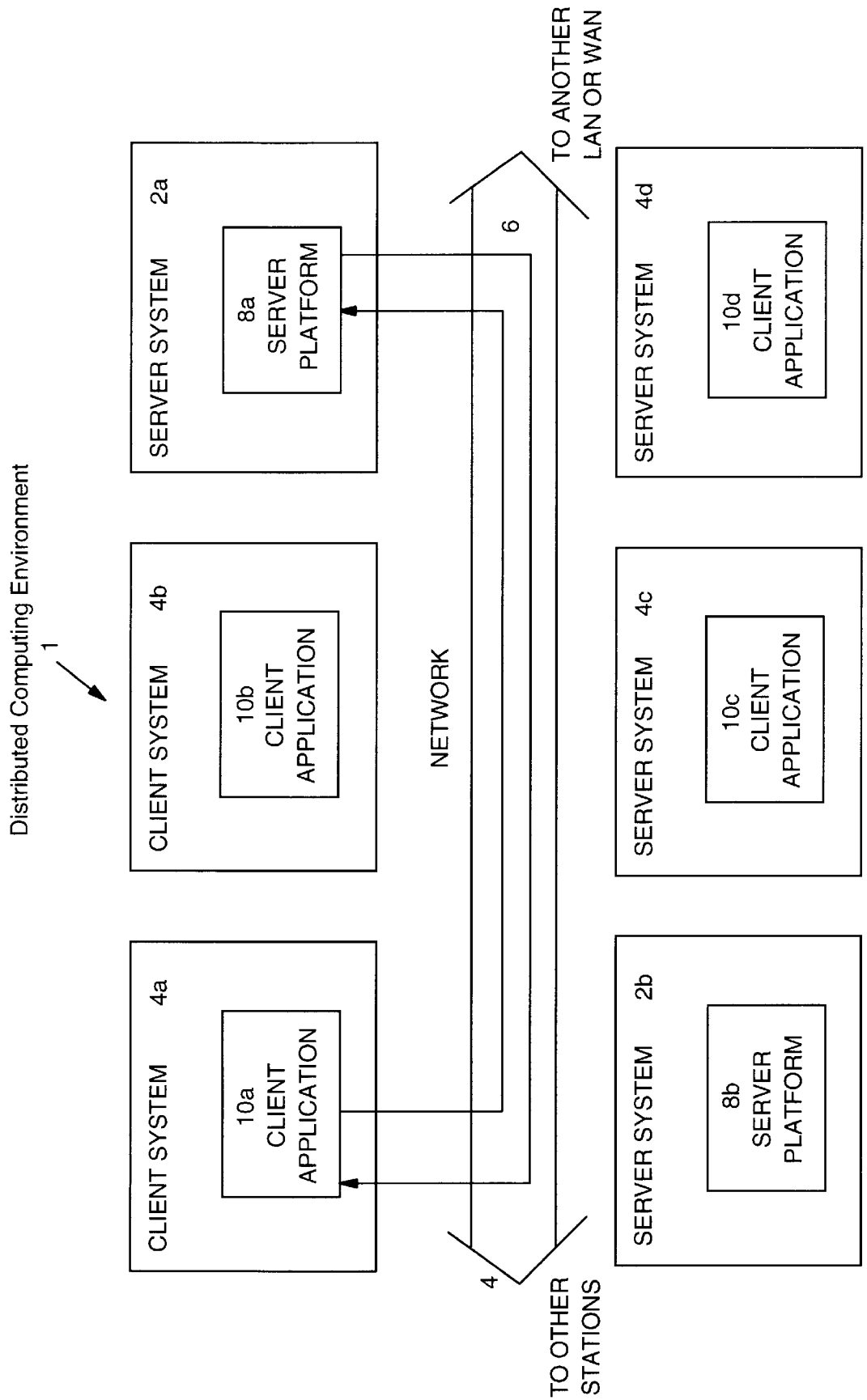
FIG. 1 shows in diagrammatic form a distributed computing environment of the type suitable for the present invention.

Reference is made to FIG. 1 which shows a distributed computing environment (DCE) 1 suitable for practising the present invention. The invention is described in the context of the Distributed Computing Environment (DCE) according to the Open Software Foundation (OSF) definition, however, the present invention is applicable to distributing computing in general. The distributed computing environment 1 has server systems, shown individually as 2a, 2b, and client systems, shown individually as 4a, 4b, 4c, 4d. The server 2 and client systems 4 are connected together through a network 6, for example, a Local Area Network (LAN). The network 6 in turn may be connected to other LANs or wide area networks (not shown).

The server 2 typically comprises a computing station having powerful processors and high capacity mass storage devices. The server 2 typically utilizes a multi-tasking platform, e.g. UNIX, allowing multiple applications, indicated generally by 8, to run concurrently. Each client system 4 comprises a data processing station executing an application, shown individually as 10a, 10b, 10c, 10d.

The Distributed Computing Environment 1 provides the capability for a client system, e.g. system 4a, to delegate or distribute processing to the server 2 and/or other client systems, e.g. 4b and 4d. The processing is distributed over the network 6 by means of Remote Procedure Calls (RPC). The RPC is a mechanism by which an application 10a running on the client station 4a invokes a procedure running on a remote station, for example, the server 2.

The operation of the RPC mechanism in a conventional DCE application 12 is described with reference to FIG. 2. A client program or application 14 executes a remote procedure call which produces a call to a client stub code 16. The client stub code 16 is part of the RPC mechanism and comprises software code. The client stub 16 puts arguments and other calling information into an internal RPC format which is transmitted by a RPC runtime library 18 over the network to the system containing the remote procedure, in this example, the called remote procedure runs on a server system 20. The runtime library 18 comprises a set of standard runtime routines for supporting DCE RPC applications, and includes routines for establishing communication between the client stub 16 and a server stub 22 and affecting the transfer of data. Because the call is made to the client stub 16, the RPC looks like a conventional local call to the client program 14.

Figure 2:
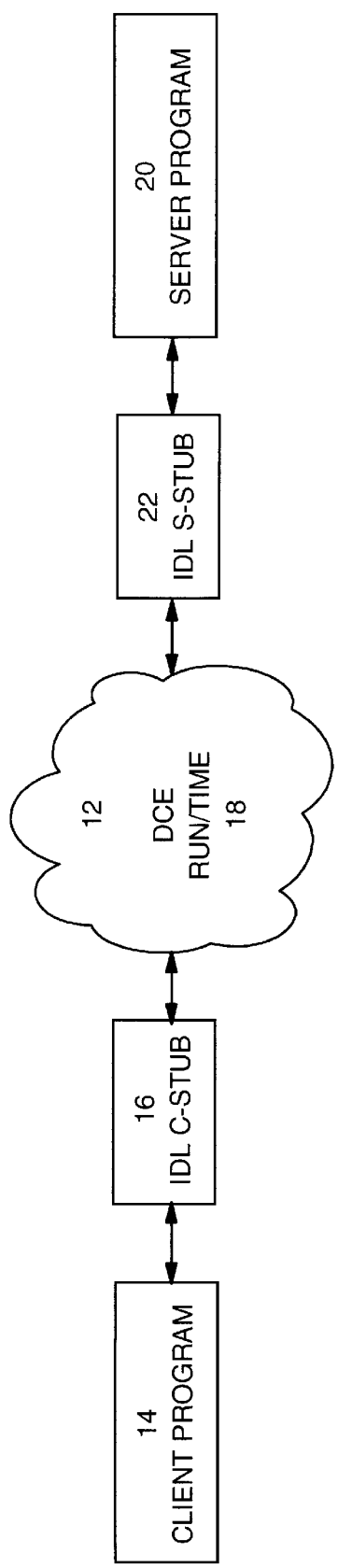
FIG. 2 shows in diagrammatic form the components of a conventional Remote Procedure Call (RPC) in a distributed computing environment.

Referring to FIG. 2, the runtime library 18 at the server 20 receives RPC format data and transfers it to the server stub code 22. The server stub 22 converts the arguments and other calling information into a format that the server program 20 can use, and the procedure executes on the server platform and address space. When the server program 20 finishes executing the procedure, the conversion and communication procedure is reversed. The server stub 22 puts the return arguments into the internal RPC format and the runtime library 18 transfers return data back to the client over the network. The client runtime library 18 receives the data and passes it to the client stub 16. The client stub 16 converts the return data for use by the client program 14 and the client program 14 continues execution with the return data from the remote procedure.

Figure 3:
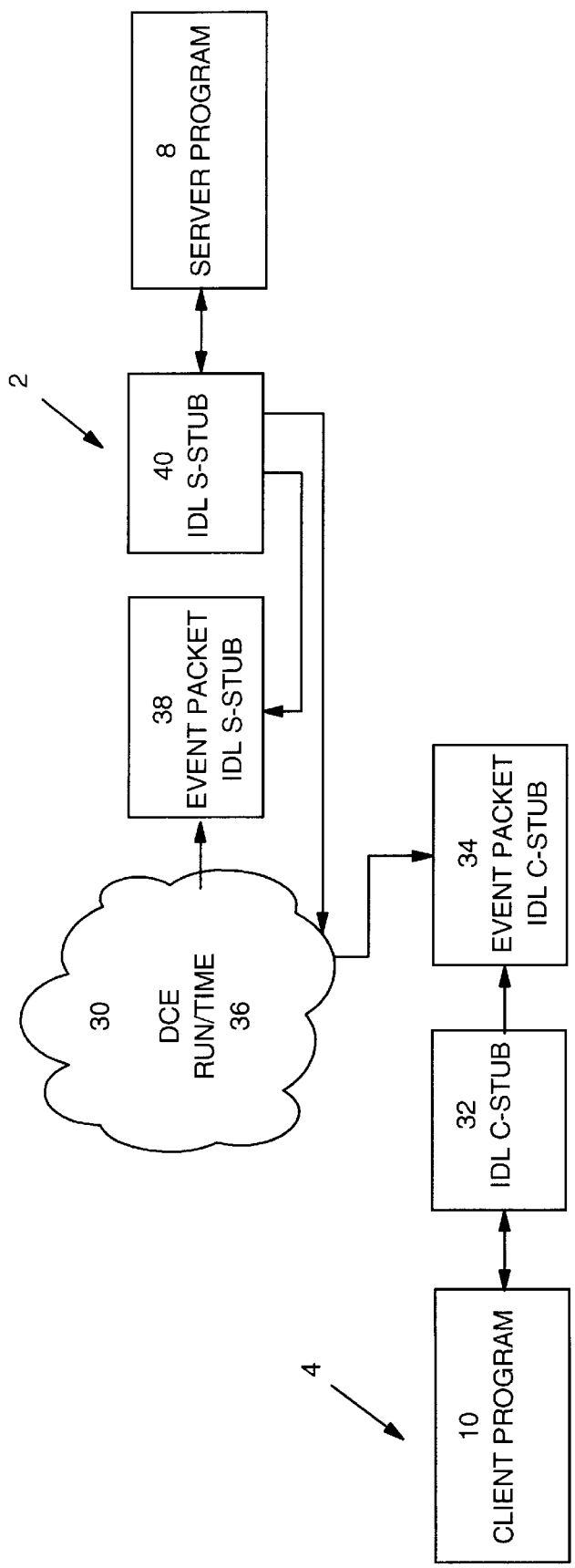
FIG. 3 shows in diagrammatic form the components of a Remote Procedure Call in a distributed computing environment according to the present invention.

Reference is next made to FIG. 3, which shows a remote procedure call mechanism according to the present invention and denoted by 30. As shown in FIG. 3, a remote procedure call begins with a client application program 10 calling a client stub code 32. Because the RPC causes a call to the local client stub code 32, the RPC looks like a traditional procedure call to the client program 10. According to the invention, the client stub code 32 invokes a call to an event information packet client stub code 34. The event packet client stub code module 34 uses a runtime RPC library 36 to transfer an Event Information Packet (EIP) to the server 2 (or another client system). In accordance with the invention, the server 2 receives the Event Information Packet through the runtime library 36 and an event information packet server stub code 38. The event information server stub code 38 makes the event information packet available to the server program 8 in the address space of the server 2.

Referring to FIG. 3, following the RPC through the event packet stub code modules 34,38, the actual RPC is executed with the client stub code 32 using the runtime library 36 to transfer information, e.g. arguments and input parameter values, associated with the remote procedure, to a server stub code module 40. The server program 8 then proceeds with execution of the procedure operating in the server address space. Concurrently with the execution of the procedure, the event information packet is available for use and updating by the server program 8. When the server program 8 finishes executing the procedure, the result of the procedure is returned to the server stub code 40. The server stub code 40 first invokes a call to the event packet server stub code 38 to return the updated event packet to the environment of the calling client program 10.

The updated event packet is received by the client event packet stub code 34 through the runtime library 36. The event packet stub 34 converts the event information packet into a format which is compatible with the platform of the client system 4. The event information packet is stored in the address space of the client system 4 and made available to the client program 8 and other applications which may be running on the client station 4, for example, a debugging/tracing utility.

The server program 8 then affects the return of the actual procedure call through the server stub code 40. The server stub code 40 uses the runtime library 36 to transfer the output parameter(s) of the remote procedure to the client stub code 32 which returns the parameter values to the client program 8. The client program 10 continues executing.

In a distributed computing environment, the software code for the RPC mechanism 30 shown in FIG. 3 is generated using a Interface Definition Language (IDL) compiler which has been modified. The IDL is a known compiler used to generate an interface definition for a RPC application. The interface definition comprises a set of remote procedure declarations and data types. In the development of client applications, the interface definition determines how to call remote procedures. For server program development in a distributed computing environment, the interface definition determines the remote procedure's return value, and the number, order, and data types of the arguments or parameters.

According to the present invention, the command line parameters of the interface definition language compiler are extended to provide a new switch (e.g. instrument). In response to the "instrument" switch in the command line, the IDL compiler modifies the client and server stubs 32,40 (FIG. 3) to produce corresponding client event information packet and server event information packet stubs 34,38. The event packet client and server stubs 34,38 pass the event information packet before the actual remote procedure call as described above with reference to FIG. 3. For distributed computing systems, other than OSF DCE, the event packet client and server stubs 34, 38 are defined through the corresponding Distributed Program Interface.

In another embodiment of the present invention, the interface definition language is modified to include an additional parameter which corresponds to the event information packet.

An example of an interface definition for a RPC in accordance with this aspect of the present invention is shown in the following listing:

```
(1)     /* '@(#) /home/dceprog/sccs/dceapp/labs/solutions/S1/s.math.idl */
        ffl
(2)     /* '@(#) /home/dceprog/sccs/bin/s.laddheader laddheader */
        uuid (12345AB6-C78D-90E1-FG23-45678HI90123),
(3)     version(1.0)
        ,
(4)     interface IntegerMath_I
        {
(5)     void add_I( /* addition procedure, no return a value      */
(6)         ffl in ' long int a,    /* 1st parameter passed in    */
(7)         ffl in ' long int b,    /* 2nd parameter passed in    */
(8)         ffl out' long *result,  /* 3rd parameter passed out   */
(9)         ffl in,out'long *instrument/* event info packet passed in/out */
        );
(10)    void subtract_I( /* subtraction procedure, no return value */
(11)        ffl in ' long int a,
(12)        ffl in ' long int b,
(13)        ffl out' long *result,
(14)        ffl in,out'long *instrument
        /* event info packet passed in/out */
        );
(15)    void multiply_I(/* multiplication procedure, no return value */
(16)        ffl in ' long int a,
(17)        ffl in ' long int b,
(18)        ffl out' long *result,
(19)        ffl in,out' long *instrument
        /* event info packet passed in/out */
        );
(20)    void divide_I(/* division procedure, no return value */
(21)        ffl in ' long int a,
(22)        ffl in ' long int b,
(23)        ffl out' long *result,
(24)        ffl in,out' long *instrument
        /* event info packet passed in/out */
        );
}
```

The interface definition comprises a header (Lines 1 to 4) and a body (Lines 5 to End). In the above listing, the syntax elements 'ffl' and "" indicate features needed for distributed applications. The header includes a unique universal identifier (uuid) attribute (Line 2) and the version number at (Line 3). The last part of the interface definition header contains the keyword "interface" (Line 4) followed by the name assigned to the interface definition, i.e. "IntegerMath_I".

The procedure declarations are found in the body of the interface definition and begin at Line 5 in the above example. The interface definition shown above includes procedure declarations for an addition procedure "add_I" (Line 5), a subtraction procedure "subtract_I" (Line 10), a multiplication procedure "multiply_I" (Line 15), and a division procedure "divide_I" (line 20). In this example, the procedures are defined by the attribute "void". The void attribute specifies that the procedure does not return a value under the name of the procedure. The transfer of data between the procedure and the calling program is handled by the parameters, i.e. arguments, specified in the procedure declaration.

The procedure declaration comprises definitions of data types, constants and includes definitions for input and output parameters. The "in" and "out" parameters are directional attributes which tell the IDL compiler which direction the data is to be sent over the network. The attribute "in" means that a value is passed into the remote procedure when it is called by the client. The attribute "out" means that a value is passed back from the server to the calling procedure in the client when the procedure returns.

Referring to the interface definition listing, the procedure "add_I" defines parameter "a" as an input, parameter "b" as an input, and parameter "result" as an output. The output parameter "result" is a pointer (signified in the C programming language by the "*" attribute). In an interface definition language (IDL) compiler, a parameter with the "out" attribute must be a pointer or array so that the parameter is passed to the client stub by reference. For example, when the procedure "add_I" is called by a client program through a remote procedure call, the client stub and runtime library will pass values for the input parameters "a" and "b" and an address for the pointer "result".

In accordance with the invention, each procedure declaration in the interface definition includes a parameter "instrument" specifying a data structure for the Event Information Packet, for example, at Line 9 for the procedure "add_I" and Line 19 for the procedure "multiply_I". In the procedure declaration, the parameter "instrument" is specified as a pointer which points to the location of the Event Information Packet structure in memory. The Event Information Packet is a data structure which stores information gathered during the execution of the remote procedure. Depending on the application, the event information packet may be a simple array or a complex data structure, for example, an array of arrays. Referring to the procedure declarations, the event information packet parameter is specified as both an input and an output in accordance with the invention. This means that the event information packet (i.e. the pointer to the location of the event information packet in memory) is passed as input parameter to the server when the client calls the remote procedure. Conversely, when the remote procedure (on the server system) returns to the calling program (on the client system), the event information packet is passed as an output parameter in accordance with the invention.

Figure 4:
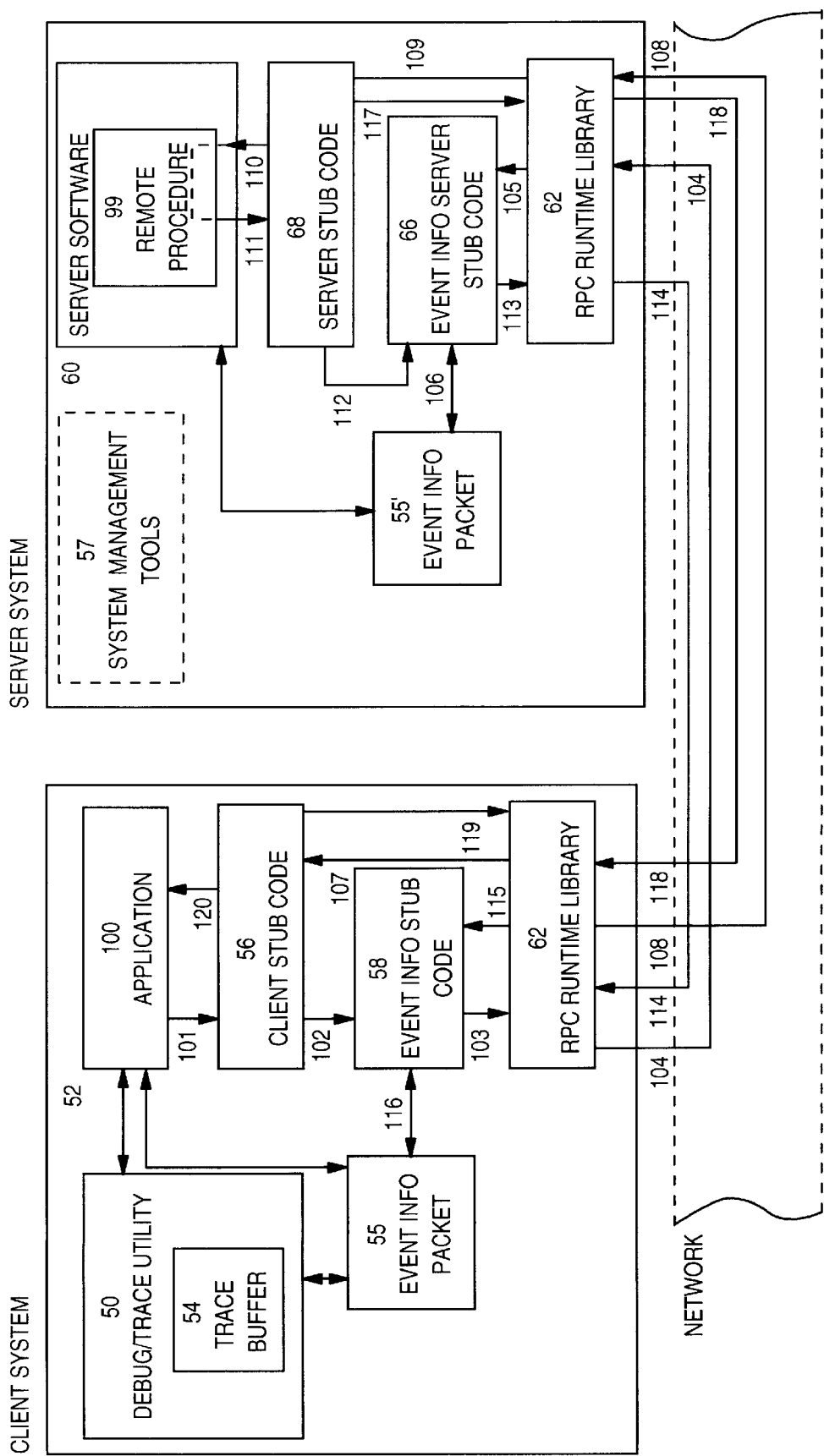
FIG. 4 shows in diagrammatic form a debug and tracing utility in a distributed computing environment according to another aspect of the present invention.

The event information packet is available for use by applications or programs executing in the client address space, and programs running in the server address space. The event information packet provides a powerful data structure and communication mechanism which can be exploited in many types of applications operating in a distributed computing environment. FIG. 4 shows an example of one such application.

Referring to FIG. 4, a debug utility 50 according to the present invention is shown in flow diagram form. The debug utility 50 is a program which collects information during execution of an application program 100 and provides a tool for a software developer to trace the execution of a program. The debug utility 50 is commonly used in the development and integration testing phases of software engineering. The software developer typically runs the debug utility 50 to collect trace data on the system where the application is being developed or tested, e.g. a client system 52 as depicted in FIG. 4.

During the execution of the application 100, the debug utility 50 gathers program data and stores the data in a trace buffer 54. In accordance with the present invention, event information on remote procedure calls is also available to the debug utility 50 through an event information packet 55 which is accessible in the address space of the client system 52. The event information packet 55 is a data structure containing data collected while the application 100 executes on the distributed computing environment.

The collection of data for the event information packet 55 during a remote procedure call is now described with reference to FIG. 4. A call to a remote procedure in the application program 100 initiates an RPC process. The remote procedure call invokes a call (101) to a client stub code 56. According to the invention, the client stub 56 invokes a call (102) to an event information packet client stub code 58. The client stub code 58 carries the event information packet 44 to the address space of the remote procedure. In this example, the remote procedure 99 is located on a server system 60. The event packet client stub 58 converts the event packet 55 into an internal RPC format. The RPC formatted event packet is passed (103) to a RPC runtime library 62 which transmits (104) the packet over the network to a RPC runtime library 64 on the server system 60.

The RPC runtime library 64 on the server system 60 receives the RPC formatted packet and transfers (105) the packet to an event information packet server stub code 66. The event packet server stub 66 converts the event information packet 55' into a format which is useable in the server address space (106). The event information packet 55' is now available to application programs running on the server platform or system management tools 57 (shown in broken outline).

In accordance with the invention, the client stub code 56 continues processing the remote procedure call. The client stub 56 puts arguments and other calling information associated with the remote procedure 99 into the internal RPC format and passes (107) the data to the runtime library 62. The runtime library 62 transfers the information over the network (108) to the runtime library 64.

The runtime library 64 on the server system 60 receives the RPC information and passes (109) it to a server stub code 68. The server stub 68 converts the RPC information into a format compatible with the server platform and the data and calling arguments are passed (110) to the remote procedure 99. The remote procedure 99 begins execution and data is collected and stored in the event information packet 55' resident in the server address space. When the procedure 99 finishes execution, data and return arguments are passed (110) to the server stub 68. In accordance with the invention, the server stub 68 invokes a call (112) to the event packet server stub 66. The event packet server stub 66 converts the updated event packet 55' information into the RPC format and passes (113) it to the runtime library 64 which transfers (114) the information over the network to the runtime library 62 at the client 52. The runtime library 62 passes (114) the returned event information packet to the event packet client stub 58. The event client stub 58 converts (116) the return event packet back for use in the client address space and the event packet 55 is stored with the updated information from the RPC.

The server stub 68 continues and the return values and arguments for the remote procedure 99 are converted and passed (117) to the runtime library 64. The runtime library 64 transfers (118) the RPC formatted return data to the runtime library 62 at the client 52. The runtime library 62 passes (119) the return data to the client stub 56 which reverses the conversion and makes (120) the return data available for use by the application 100.

The information in the event information packet 55 can be copied into the trace buffer 54 for use by the debug utility 50. The features and functionality provided by the debug utility 50 are a design choice and within the ability of one skilled in the computer programming arts.

The present invention may be embodied in other specific forms without departing from the spirit or essential characteristics thereof. The structure described in FIG. 4, for example, has wider applicability to event information relating to any noteworthy state change in clients/servers in the distributed system. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

The embodiments of the invention in which an exclusive property or privilege is claimed are defined as follows:

1. A networked distributed computing environment having an interface definition language compiler for producing stub codes for client and server in a computer system comprising:

a server system;

a client system comprising stub code means responsive to a call in said client system for initiating a remote procedure call (RPC) to said server system;

network means for transferring information between said server system and said client system, said information including a RPC and results therefrom;

said means for initiating a RPC having means comprising event stub code means responsive to said stub code means for initiating a RPC, for transporting an event information packet with said RPC, said event information packet providing a means for collecting trace data relating to the execution of said RPC; and said client and server systems including stub code means for updating said event information packet at every RPC with information collected while an application invoked by said RPC executes on said distributed computing environment;

said client and server stub code means also converting said event information packet into a format usable in the respective address spaces of said client and said server systems for a debugging utility.

2. In a distributed computer environment having an interface definition language compiler for producing stub codes for client and server, a computer system having a client system operating in a client address space, a server system operating in a server address space, communication means for communicating between the client system and the server system, a method performed by said computer system in processing a RPC comprising steps of:

initiating a RPC between the client system and the server system;

said initiating system processing said RPC by transmitting an information packet for containing data collected while an application executes in said distributed computing environment to the address space of said system having the remote procedure;

said initiating system transmitting procedure calling information to the remote system;

said remote system using said procedure calling information to process said RPC, and said remote system generating program information for updating said information packet including gathering trace data associated with execution of said remote procedure in the address space wherein said remote procedure resides;

said transmitting comprising calling stub code means in the address space of said initiating system, and said stub code means transmitting said information packet by means of a data structure contained in said procedure calling information.

3. A computer program product for use in a computer system having a client system operating in a client address space, a server system operating in a server address space, communication means for communicating between the client system and the server system, said computer program product comprising:

a recording medium;

means recorded on said medium for instructing said computer system to perform the steps of,
(a) initiating a remote procedure call between the client system and the server system:
(b) said initiating system processing said remote procedure call by transmitting an information packet for containing data collected while an application executes in said computer system to the address space of said system having the remote procedure;
(c) said initiating system transmitting procedure calling information to the remote system;
(d) said remote system using said procedure calling information to process said remote procedure call, and said remote system generating program information including trace data relating to the execution of said remote procedure call for updating said information packet;
(e) passing said updated information packet using stub code means for transmitting and receiving, by means of a data structure contained in said procedure calling information, to the address space of said initiating system.

* * * * *